(12) United States Patent
Peng et al.

(10) Patent No.: US 10,467,374 B2
(45) Date of Patent: Nov. 5, 2019

(54) SYSTEM AND METHOD FOR CALCULATING CELL EDGE LEAKAGE

(71) Applicant: Taiwan Semiconductor Manufacturing Company Limited, Hsinchu (TW)

(72) Inventors: Shih-Wei Peng, Hsinchu (TW); Charles Chew-Yuen Young, Cupertino, CA (US); Jiann-Tyng Tzeng, Hsinchu (TW); Kam-Tou Sio, Hsinchu County (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 223 days.

(21) Appl. No.: 15/638,510

(22) Filed: Jun. 30, 2017

(65) Prior Publication Data

US 2019/0005181 A1    Jan. 3, 2019

(51) Int. Cl.
*G06F 17/50* (2006.01)

(52) U.S. Cl.
CPC ...... *G06F 17/5081* (2013.01); *G06F 17/5036* (2013.01); *G06F 17/5022* (2013.01); *G06F 2217/82* (2013.01)

(58) Field of Classification Search
USPC ........................................................ 716/136
See application file for complete search history.

(56) References Cited

U.S. PATENT DOCUMENTS

| | | | |
|---|---|---|---|
| 2005/0044515 A1* | 2/2005 | Acar | G06F 17/5022 716/109 |
| 2019/0005181 A1* | 1/2019 | Peng | G06F 17/5022 |

\* cited by examiner

*Primary Examiner* — Mohammed Alam
(74) *Attorney, Agent, or Firm* — Jones Day

(57) ABSTRACT

A method for calculating cell edge leakage in a semiconductor device comprising performing a device leakage simulation to obtain leakage information for different cell edge conditions and providing attributes associated with cell edges in the semiconductor device. The method further comprises performing an analysis to identify cell abutment cases present in the semiconductor device and calculating the leakage of the semiconductor device based at least in part on probabilities associated with the cell abutment cases and the simulated leakage values obtained from the device leakage simulation.

20 Claims, 6 Drawing Sheets

FIG. 6

SYSTEM AND METHOD FOR CALCULATING CELL EDGE LEAKAGE

TECHNICAL FIELD

This relates to semiconductor devices and more particularly to systems and methods for calculating edge leakage between adjacent semiconductor cells.

BACKGROUND

Semiconductor devices may include several transistor cells arranged in a predefined pattern. For example, in the case of FET (field effect transistor) devices, several source/drain pairs may be fabricated on a substrate and a corresponding gate electrode may be formed over the source/drain pair. In operation, adjacent cells may experience a leakage current at the edge of cell. As a result, adjacent cells may be separated to reduce the overall effect of leakage within the semiconductor device. However, separating adjacent cells results in an increase in the design area of the semiconductor device.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 6 is a table illustrating an example of the cell abutment leakage calculation in accordance with some embodiments.

DETAILED DESCRIPTION

Figure 1A:
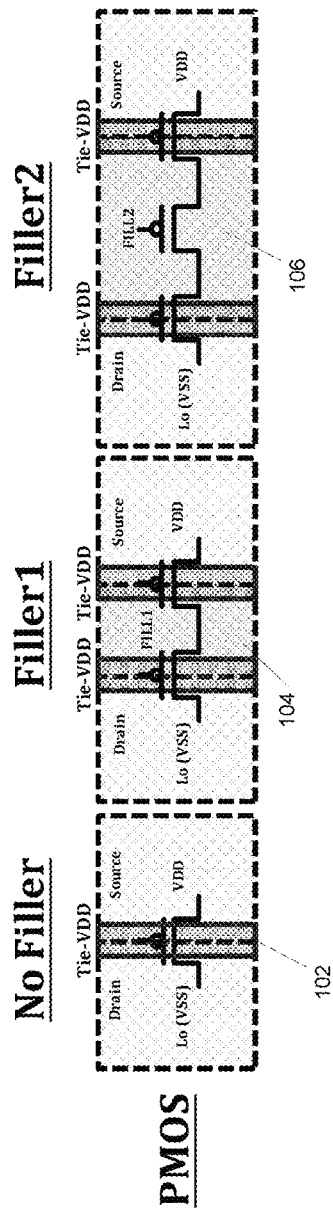
FIG. 1A is a schematic diagram illustrating examples of PMOS cell abutment scenarios in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Semiconductor devices may include several transistor cells arranged in a predefined pattern. For example, in the case of FET (field effect transistor) devices, several source/drain pairs may be fabricated on a substrate and a corresponding gate electrode may be formed over the source/drain pair. In operation, adjacent cells may experience a leakage at the edge of cell. One type of semiconductor device that experiences leakage is a continuous oxide diffusion (CNOD) semiconductor device. In a CNOD semiconductor device, adjacent cells experience the typical leakage currents associated with other types of semiconductor devices as well as an additional leakage at the edges of the cells because of the continuous nature of the oxide diffusion region. In a CNOD semiconductor device, the source and drain for multiple semiconductor cells are formed in a continuous oxide diffusion substrate. As a result of this structure, the separation between adjacent cells is accomplished by doping the oxide diffusion layer to form a filler region. In some instances, there may not be any physical separation between adjacent cells. The additional leakage experienced by the CNOD semiconductor device varies depending on the cell boundary conditions (e.g., whether the edge of the cell is a source-source boundary, a source-drain boundary, or a drain-drain boundary, different filler regions, and/or different voltage thresholds).

Figure 1B:
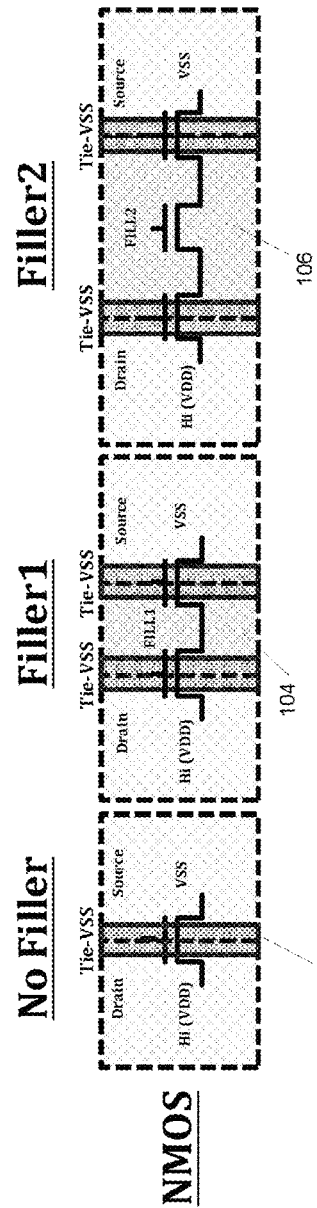
FIG. 1B is a schematic diagram illustrating examples of PMOS cell abutment scenarios in accordance with some embodiments.

FIG. 1A is a schematic diagram illustrating examples of PMOS cell abutment scenarios in accordance with some embodiments and FIG. 1B is a schematic diagram illustrating examples of PMOS cell abutment scenarios in accordance with some embodiments. As illustrated in these figures, there are several different conditions that may occur between adjacent cells. For example, the boundary between two cells may have no filler region 102. In some cases, the boundary 104 between two cells may have one filler region 104 or two filler regions 106. Although not illustrated in the figures, in some embodiments, there may be additional (e.g., 3, 4, or 5) filler regions at the boundary between two cells.

Although FIG. 1A and FIG. 1B illustrate one cell abutting the source of another cell (i.e., a drain-source (DS) abutment), in some cases, the semiconductor device may include drain-drain (DD) abutments and source-source (SS) abutments. Also, in some embodiments, cells with different types of transistors may be located in the same semiconductor device and positioned adjacent to each other. For example, in some embodiments, transistors with different threshold voltages may be incorporated into the semiconductor device. The cells may include transistors with a standard voltage threshold (SVT), a low voltage threshold (LVT), and/or an ultra low voltage threshold (uLVT). Additionally, in some embodiments, PMOS and NMOS transistors may be implemented in different cells. As discussed in more detail below, these differences between the various transistors can have an effect on the amount of leakage (e.g., additional leakage) experienced at the edge of a cell. For example, between the three abutment cases, a DS abutment generally experiences more leakage than a DD abutment or SS abutment.

Because these different attributes of the transistors and cells (e.g., abutment type, voltage thresholds, MOS type, etc.) contribute to differences in the amount of leakage (e.g., additional leakage) at different boundaries between adjacent cells, simply assuming a worst case scenario for leakage during the design of a semiconductor device, may be undesirable and in some cases inaccurate. In some embodiments, it may be desirable to more accurately determine the edge leakage of the device by analyzing the actual device.

Figure 2:
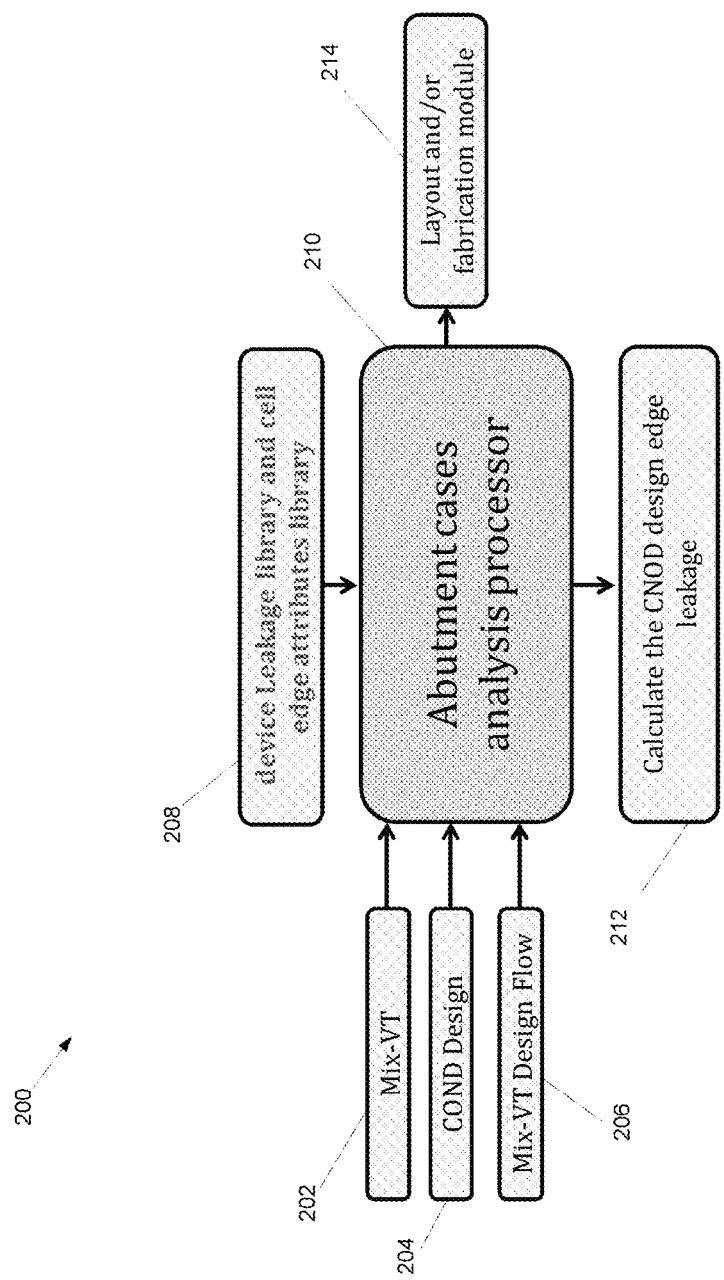
FIG. 2 is a schematic diagram illustrating an example of a cell abutment analysis system in accordance with some embodiments.

FIG. 2 is a schematic diagram illustrating an example of a cell abutment analysis system in accordance with some embodiments. As illustrated, in FIG. 2, a cell abutment analysis system 200 includes an abutment cases analysis processor 210 that receives several inputs 202, 204, 206, 208 and outputs a calculation of the leakage of the cell edge device 212. The cell abutment analysis system 200 further includes a layout and/or fabrication module 214. In some embodiments, the information input to the abutment cases analysis processor 210 may be calculated by an associated processor and/or stored in a memory that may be local to the abutment cases analysis processor 210 or remotely located relative to the abutment cases analysis processor 210. In more detail, the edge device leakage library and cell edges attributes library 208 may provide information about leakage (e.g., additional leakage of a CNOD device) for different conditions. For example, in some embodiments, the leakage information may be obtained via simulation of different filler distances and/or different abutment conditions (e.g., SS, DD, DS abutments) and/or different MOS types. The results of the simulation may provide information about the leakage for various types of cell boundaries. For example, in some embodiments, edge device leakage currents for particular transistor designs may be measured and the resulting data may be extrapolated to include a complete set of data in the device leakage library. In some embodiments, such measurements may be done separately for PMOS and NMOS devices. In some embodiments, models of various transistors and conditions may be used to obtain approximations of the leakage. In some embodiments, the cell edges attributes library 208 may provide information about different attributes of the cell. For example, the attributes may include the type of cell (e.g., PMOS or NMOS), the probability that the cell contains a logically high voltage (e.g., logical 1), the probability that the cell contains a logically low voltage (e.g., logical 0), the position of the source and drain, etc.

The Threshold Voltages 202, CNOD design 204, and Threshold Voltage Design Flow 206 may collectively provide relevant information about the semiconductor device of interest. For example, the Threshold Voltages 202 information may provide information about the different cells and their corresponding threshold voltages (SVT, LVT, uLVT, etc.). The CNOD design information 204 and the Threshold Voltages Design Flow information 206 may provide information about different attributes of the cell. For example, the attributes may include the type of cell (e.g., PMOS or NMOS), the probability that the cell contains a logically high voltage (e.g., logical 1), the probability that the cell contains a logically low voltage (e.g., logical 0), the position of the source and drain, etc. In some embodiments, the CNOD design information 204 may provide information about the cell placement in the design. The cell placement may include the cell location and orientation for abutment cases analysis processor 210 to know the cell boundary conditions. In some embodiments, the Threshold Voltages Design Flow information 206 may provide some factors to decrease/increase leakage of the device (e.g., whole design leakage). In some embodiments, it may be time consuming to calculate all of the abutment conditions for leakage. Accordingly, in some embodiments, the processor 210 may use scaling factors (or a similar construct) to represent the additional leakage of design.

Utilizing the library information and the attributes of the actual semiconductor device of interest, the abutment case analysis processor 210 may be configured to perform a design abutment analysis to identify the various abutment cases present in the semiconductor design of interest and calculate the probability of particular states for the various abutment cases. Then this information may be combined with the leakage information obtained from the library to output a calculation of the CNOD design edge leakage 212. The abutment case analysis processor 210 may also be configured to communicate information to the layout and/or fabrication module 214 to enable the layout and/or fabrication module 214 to create a layout and/or fabricate the semiconductor device or modify the layout of an existing semiconductor device.

In some embodiments, the total edge leakage of the semiconductor device may be determined by the following formula:

$$L_{total\_edge\_leakage} = \sum_{k=DD,DS,SS} A_k \times L_{Edge\_device} \times P_k$$

In the equation above, $L_{total\_edge\_leakage}$ is the total leakage of the semiconductor device; $L_{edge\_device}$ is the device leakage of the cell edge as determined by the simulation/library discussed above, k corresponds to the various abutment cases—drain-drain, drain-source, and source-source (DD, DS, SS), Pk is the state probability (e.g., the probability that a particular boundary state exists) as determined based on the design of the semiconductor device for a given abutment case k, and Ak is the placement for the particular abutment cases k. This total edge leakage determination is described in further detail below in the example use case walkthrough of FIG. 4.

Figure 3:
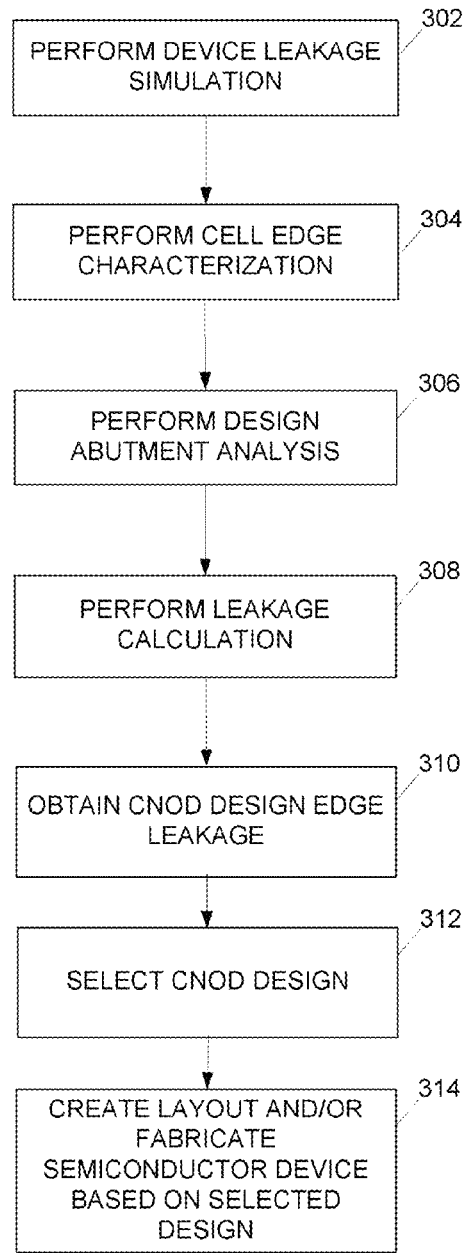
FIG. 3 is a flow chart illustrating a method for calculating cell abutment leakage in accordance with some embodiments.

FIG. 3 is a flow chart illustrating a method for calculating cell abutment leakage in accordance with some embodiments. To aid with the understanding of the flow chart, the operations in FIG. 3 will be described with reference to FIG. 2. It should be understood that systems other than system 200 may also be used. In operation 302, the system 200 performs device leakage simulations to obtain a device leakage library and cell edge attributes information 208 which can then be an input to the abutment cases analysis processor 210. In operation 304, the system 200 performs a cell edge characterization to obtain the semiconductor device's cell attributes discussed above with respect to inputs 202, 204, and 206. In operation 306, the abutment cases analysis processor 210 performs an abutment analysis to identify the various abutment cases in the semiconductor design of interest and their various state probabilities. In operation 308, the system 200 calculates the leakage by utilizing the abutment cases obtained in operation 306 and combining that information with the library information obtained in operation 302. In operation 310, the system 200 obtains the CNOD design edge leakage for the semiconductor design (e.g., by use of the formula discussed above). In operation 312, a CNOD design is selected from one or more available design choices and, in operation 314, a layout of the semiconductor design is created and the semiconductor design is fabricated using the layout and/or fabrication module 214 and based on the selected CNOD design from operation 312.

In some embodiments, the leakage obtained using the methods and systems described herein may be used to reduce the leakage impact of the design by about 40% enabling the design of the semiconductor device to be smaller (e.g., about 5-7% smaller). In some embodiments, a particular design choice may be selected based at least in part on whether the leakage savings in more/less than a predetermined threshold compared to the area increase/decrease of the semiconductor device. For example, in some embodiments, an increase in the amount of leakage may be tolerated in exchange for enabling the semiconductor device to be smaller. In some embodiments, a large device may be accepted in exchange for reduced leakage. In some embodiments, this (an other) information may be used to modify an existing design of a semiconductor device. For example, the new design or design choice may be compared to an existing design choice an various relative metrics (e.g., the relative percentages discussed above) may be provided as a comparison between an existing and modified design.

Figure 4:
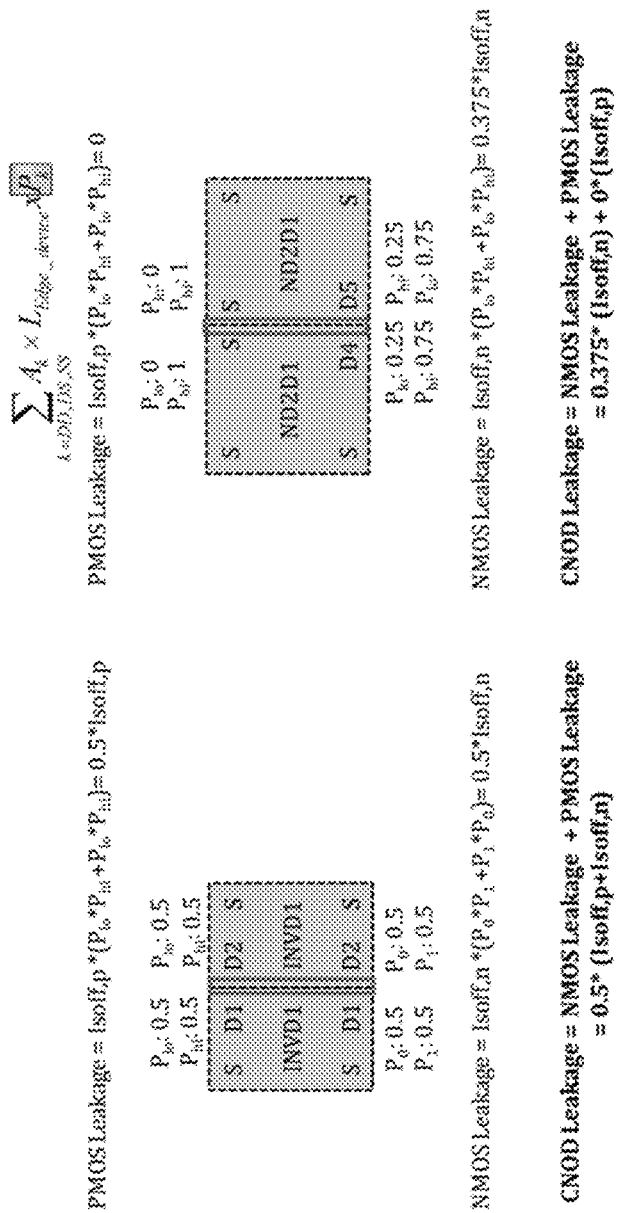
FIG. 4 is a schematic diagram illustrating a method for performing cell edge characterization in accordance with some embodiments.

FIG. 4 is a schematic diagram illustrating a method for performing cell edge characterization in accordance with some embodiments. As discussed above with respect to FIG. 3, in operation 304, the system 200 performs a cell edge characterization to obtain the semiconductor device's cell attributes. In some embodiments, this may include obtaining source and drain state probabilities (P) to calculate PMOS and NMOS leakages and then based on these values, calculating the CNOD leakage. In some embodiments, the cell attributes may include the MOS type, the abutment case, and/or the state probability. As illustrated in FIG. 4, using the cell attribute, the CNOD leakage (e.g., cell characterization) can be calculated as the sum of the PMOS and NMOS leakage. In the case of FIG. 4, the left hand analysis is for one abutment case and the analysis on the right side fo the figure is for a second abutment case. The information obtained by this analysis (e.f., CNOD leakage) may be stored in memory.

Figure 5:
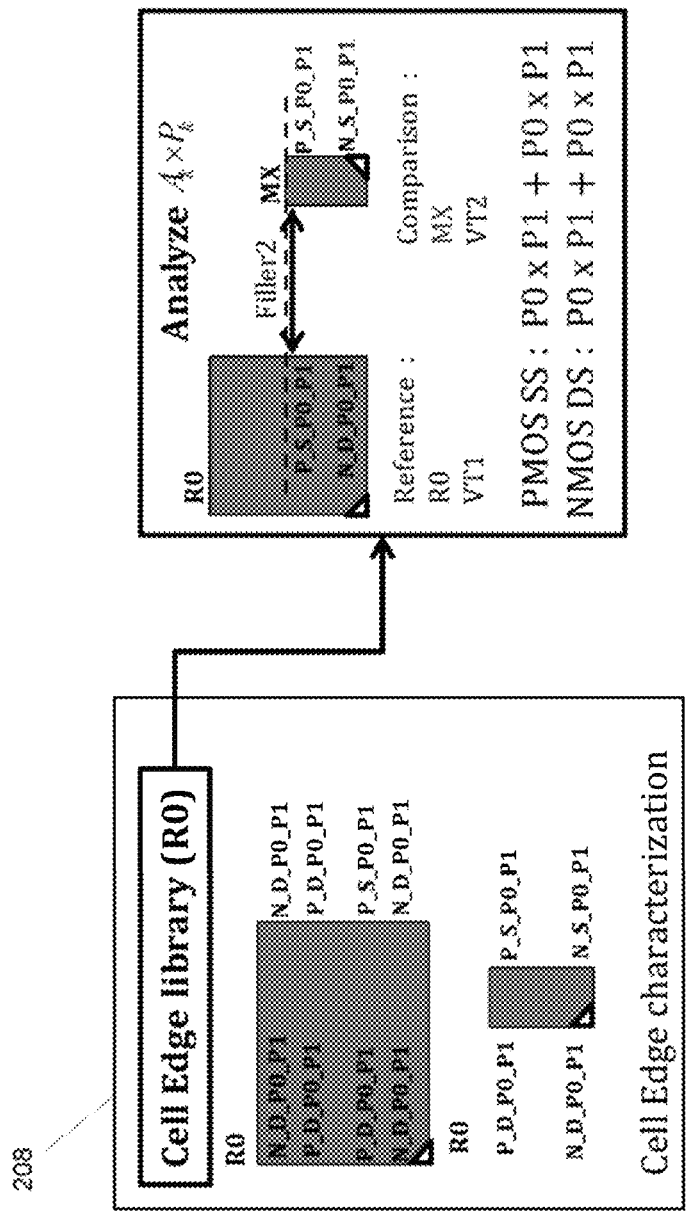
FIG. 5 is a schematic diagram illustrating a method for performing design abutment analysis in accordance with some embodiments.

FIG. 5 is a schematic diagram illustrating a method for performing design abutment analysis in accordance with some embodiments. Once the information is obtained from the characterization process discussed above, the design abutment analysis, performs an abutment analysis to identify the various abutment cases in the semiconductor design of interest and their various leakages. For example, as illustrated in FIG. 5, the cell edge library 208 may store cell edge characterization information obtained during the cell edge characterization operation 304. That information may then be used to analyze the leakage associated with various abutment scenarios.

Figure 6:
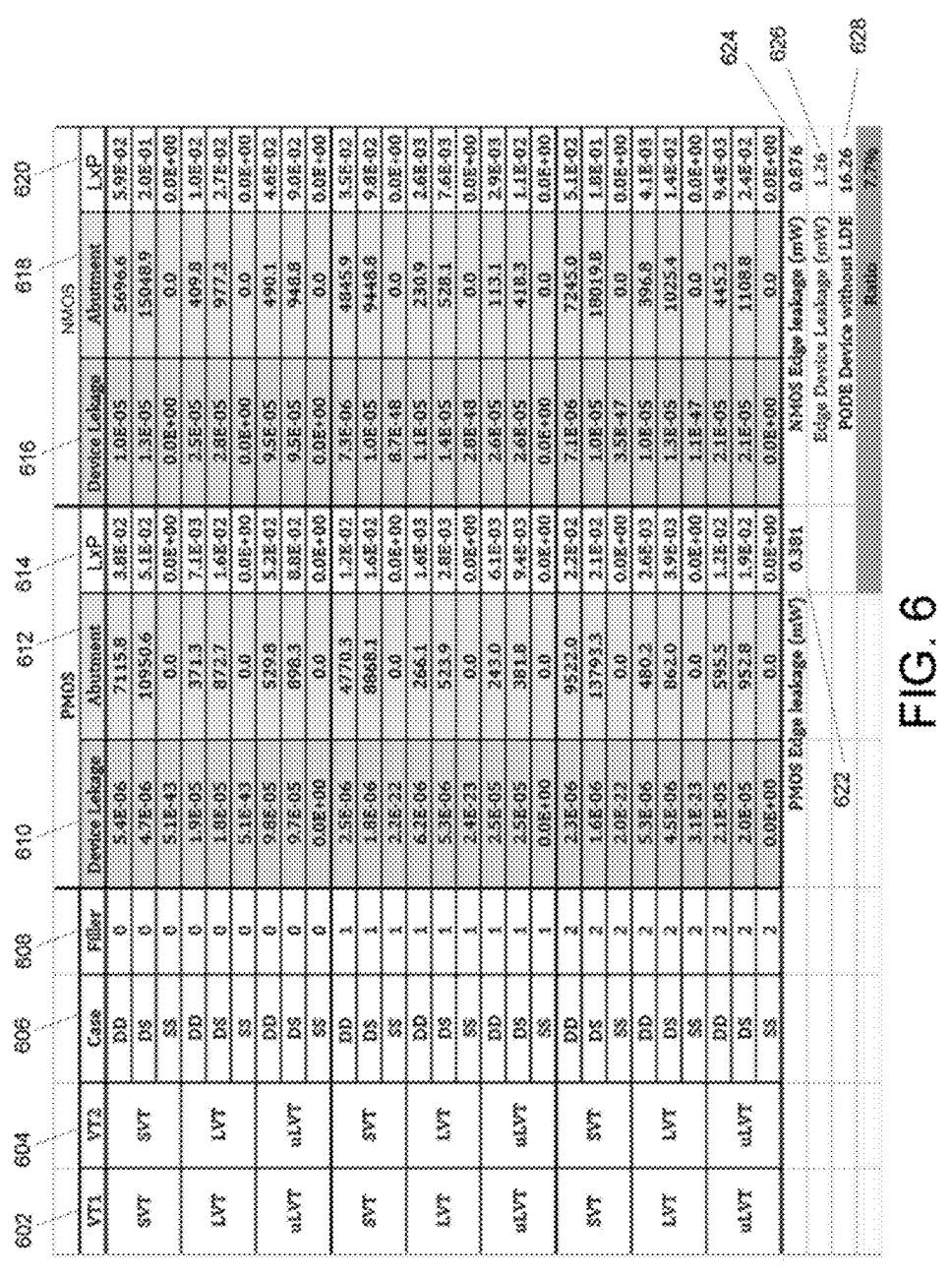

FIG. 6 is a table illustrating an example of the cell abutment leakage calculation in accordance with some embodiments. The information illustrated in FIG. 6 is an example of the inputs 202, 204, 206, 208 provided to the abutment cases analysis processor 210 to calculate the design edge leakage of the semiconductor device. As illustrated, columns 602 (VT1) and 404 (VT2) include different combinations of threshold voltages that characterize adjoining cells. For example, adjoining cells may each be standard voltage threshold (SVT), low voltage threshold (LVT), or ultra-low voltage threshold (uLVT) cells. Although not illustrated in the table, other combinations of adjoining cells may also be considered for creation of library information 208 and semiconductor device cell attributes 202, 204, 206. In the next column 606, the abutment case is provided. As illustrated, the three possible abutment cases (DD, DS, SS) are each considered with respect to each adjoining cell combination. In column 408, filler information is provided. As seen in the table, no fill (0), 1 filler (1) and 2 fillers (2) are each considered for all nine combinations of adjoining cells and abutment cases. Although not illustrated, it additional filler sizes (e.g., 3, 4, and 5) may also be provided. In exemplary embodiments, the various combinations of elements in columns 602, 604, 606, 608 may correspond to the various combinations of cell edges present in the semiconductor device of interest. In some embodiments, the various combinations of elements in columns 602, 604, 606, 608 may correspond to the possibilities for combinations of cell edges that may exist in the semiconductor design. By using a more comprehensive library, it may be possible to utilize the same or a substantially similar library for different semiconductor devices.

Next, the table is divided into two sections—a PMOS section (610, 612, 614) and an NMOS section (616, 618, 620). As discussed above, the MOS type (PMOS or NMOS may also be a relevant cell attribute. The same information is obtained/calculated for both the PMOS and the NMOS devices. In columns 610 and 616, the device leakage ($L_{edge\_device}$) is provided. As discussed above, this information may be obtained by performing device leakage simulating. In columns 612 and 618, abutment probabilities are provided. In this case, the numerical value in this column corresponds to the sum of all the probabilities in the whole design. For example, the probability of each abutment case in the design may be calculated for all of the adjoining cells and then the boundaries with the identified MOS type, adjoining cells and abutment cases may be summed together. In columns 614 and 620, the product of the device leakage and abutment are provided for each boundary. The values in column 614 are summed to obtain the total PMOS edge leakage 622 and the values in column 620 are summed to obtain the total NMOS edge leakage 624. Edge leakage values 622 and 624 are summed to obtain the total leakage value of the semiconductor device 626.

For example, looking at the first row of the table, the cell edge is formed by two SVT transistors (602, 604). The drains of both transistors are aligned at the edge (606) and there is no filler (608). The leakage simulation has identified that device leakage in this condition to be 5.4E-06 (610). Column 612 indicates that the sum of the state probabilities for this condition is 7115.8 (i.e., the state probability for a cell edge meeting this condition multiplied with the total number of cell edges meeting the defined conditions). The device leakage 610 and the abutment 612 are multiplied to obtain the leakage attributable to all of the cell edges in the semiconductor device meeting the defined conditions (i.e., SVT-SVT, DD, Filler-0, PMOS) 614.

As further indicated in FIG. 4, the semiconductor device leakage 626 as calculated using the methods described herein are significantly lower than the leakage calculated using a worst case scenario 628. In some embodiments, the more accurate edge leakage in 626 enables the semiconductor device to be designed such that it is about 7-8% smaller. That is, because the more accurate leakage determined using the systems and methods describe herein shows that, in reality, the design are not as prone to detrimental leakage as thought using the worst case value. Thus, the designer can be more aggressive in positioning of cells—achieving a material space savings.

Some embodiments described herein may include a method for calculating cell edge leakage in a semiconductor device comprising performing a device leakage simulation to obtain leakage information for different cell edge conditions and providing attributes associated with cell edges in the semiconductor device. The method further comprises performing an analysis to identify cell abutment cases present in the semiconductor device and calculating the leakage of the semiconductor device based at least in part on probabilities associated with the cell abutment cases and the simulated leakage values obtained from the device leakage simulation.

Some embodiments described herein may include a system for calculating cell edge leakage in a semiconductor device comprising a library containing device leakage simulation results related to leakage information for different cell edge conditions and an input for obtaining attributes associated with cell edges in the semiconductor device. The system may further include a processor configured to perform an analysis to identify cell abutment cases present in the semiconductor device; and calculate the leakage of the semiconductor device based at least in part on probabilities associated with the cell abutment cases and the simulated leakage values obtained from the device leakage simulation. An output may be provided for outputting the cell edge leakage in the semiconductor device.

Some embodiments described herein may include a method for reducing the layout size of a semiconductor device comprising calculating cell edge leakage of the semiconductor device to obtain a more accurate assessment of the leakage in the semiconductor device than relying on a worst case scenario and designing the layout of the semiconductor device based at least in part on the calculated cell edge leakage. The step of calculating cell edge leakage of the semiconductor device may comprise performing a device leakage simulation to obtain leakage information for different cell edge conditions, providing attributes associated with cell edges in the semiconductor device, and performing an analysis to identify cell abutment cases present in the semiconductor device. The calculation of the leakage of the semiconductor device may be based at least in part on probabilities associated with the cell abutment cases and the simulated leakage values obtained from the device leakage simulation.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A method for calculating cell edge leakage in a semiconductor device comprising:
   performing a device leakage simulation to obtain leakage information for different cell edge conditions;
   providing attributes associated with cell edges in the semiconductor device;
   performing an analysis to identify cell abutment cases present in the semiconductor device; and
   calculating the leakage of the semiconductor device based at least in part on probabilities associated with the cell abutment cases and the simulated leakage values obtained from the device leakage simulation;
   wherein the cell abutment cases comprise a source-source boundary, a source-drain boundary, and a drain-drain boundary.

2. The method of claim 1, wherein the device leakage simulation is performed by identifying different combinations of cell edge conditions and measuring the cell edge leakage for each combination.

3. The method of claim 1, wherein the probabilities associated with the cell abutment cases correspond to the probability that a value stored in the cell corresponds to a logical high value or a logical low value.

4. The method of claim 1, further comprising modifying a design of the semiconductor device based at least in part on the calculated leakage of the semiconductor device.

5. The method of claim 1, wherein the semiconductor device is a continuous oxide diffusion semiconductor device.

6. The method of claim 1, wherein the cell edge conditions comprise any combination of one or more of abutment type, voltage thresholds, and MOS type, and wherein the abutment types comprise a source-source abutment, a drain-drain abutment, and a drain-source abutment.

7. The method of claim 3, wherein the voltage thresholds comprise any combination of one or more of a standard voltage threshold, a low voltage threshold, and an ultra low voltage threshold.

8. The method of claim 1, wherein the attributes associated with the cell edges comprise any combination of one or more of the type of cell, the probability that the cell contains a logically high voltage, the probability that the cell contains a logically low voltage, and the position of the source and drain within the cell, and wherein the type of cell may be a PMOS cell or an NMOS cell.

9. The method of claim 1, wherein the cell edge leakage in the semiconductor device is determined as follows:

$$L_{total\_edge\_leakage} = \sum_{k=DD,DS,SS} A_k \times L_{Edge\_device} \times P_k$$

wherein the $L_{total\_edge\_leakage}$ is the cell edge leakage in the semiconductor device; $L_{edge\_device}$ is the leakage information associated with the cell edge, P is a state probability of the cell abutment cases for a given abutment case k, and A is the placement for a given abutment case k.

10. A system for calculating cell edge leakage in a semiconductor device comprising:
    a library containing device leakage simulation results related to leakage information for different cell edge conditions;
    an input for obtaining attributes associated with cell edges in the semiconductor device;
    a processor configured to perform an analysis to identify cell abutment cases present in the semiconductor device; and calculate the leakage of the semiconductor device based at least in part on probabilities associated with the cell abutment cases and the simulated leakage values obtained from the device leakage simulation; and
    an output for outputting the cell edge leakage in the semiconductor device;
    wherein the cell abutment cases comprise a source-source boundary, a source-drain boundary, and a drain-drain boundary.

11. The system of claim 10, wherein the semiconductor device is a continuous oxide diffusion semiconductor device.

12. The system of claim 10, wherein the cell edge conditions comprise any combination of one or more of abutment type, voltage thresholds, and MOS type.

13. The system of claim 12, wherein the abutment types comprise a source-source abutment, a drain-drain abutment, and a drain-source abutment.

14. The system of claim 12, wherein the voltage thresholds comprise any combination of one or more of a standard voltage threshold, a low voltage threshold, and an ultra low voltage threshold.

15. The system of claim 10, wherein the attributes associated with the cell edges comprise any combination of one or more of the type of cell, the probability that the cell contains a logically high voltage, the probability that the cell contains a logically low voltage , and the position of the source and drain within the cell.

16. The system of claim 15, wherein the type of cell may be a PMOS cell or an NMOS cell.

17. A method for designing a semiconductor device comprising:
    calculating cell edge leakage of the semiconductor device to obtain a more accurate assessment of the leakage in the semiconductor device than relying on a worst case scenario; and
    designing the layout of the semiconductor device based at least in part on the calculated cell edge leakage;
    wherein calculating cell edge leakage of the semiconductor device comprises:
    performing a device leakage simulation to obtain leakage information for different cell edge conditions;
    providing attributes associated with cell edges in the semiconductor device;
    performing an analysis to identify cell abutment cases present in the semiconductor device; and
    calculating the leakage of the semiconductor device based at least in part on probabilities associated with the cell abutment cases and the simulated leakage values obtained from the device leakage simulations;
    wherein the cell abutment cases comprise a source-source boundary, a source-drain boundary, and a drain-drain boundary.

18. The method of claim 17, further comprising modifying a design of the semiconductor device based at least in part on the calculated leakage of the semiconductor device.

19. The method of claim 1, wherein the cell edge conditions comprise any combination of one or more of abutment type, voltage thresholds, and MOS type.

20. The method of claim 17, wherein the attributes associated with the cell edges comprise any combination of one or more of the type of cell, the probability that the cell contains a logically high voltage, the probability that the cell contains a logically low voltage , and the position of the source and drain within the cell.

* * * * *